United States Patent
Wilcher et al.

(10) Patent No.: US 7,972,503 B2
(45) Date of Patent: Jul. 5, 2011

(54) ADJUSTABLE PIN RACK SYSTEMS FOR COG RAKE BAR SCREENS

(75) Inventors: Stephen B. Wilcher, Harleysville, PA (US); Jeffrey R. Blondin, Allentown, PA (US)

(73) Assignee: WSG & Solutions, Inc., Chalfont, PA (US)

( * ) Notice: Subject to any disclaimer, the term of this patent is extended or adjusted under 35 U.S.C. 154(b) by 1639 days.

(21) Appl. No.: 11/269,111

(22) Filed: Nov. 8, 2005

(65) Prior Publication Data

US 2007/0102334 A1     May 10, 2007

(51) Int. Cl.
    *E02B 5/08* (2006.01)
(52) U.S. Cl. ......... 210/159; 210/162; 210/232; 210/236
(58) Field of Classification Search .......................... None
    See application file for complete search history.

(56) References Cited

U.S. PATENT DOCUMENTS

| | | | |
|---|---|---|---|
| 2,068,428 A * | 1/1937 | Morehead | 210/526 |
| 2,723,391 A * | 11/1955 | Hailey | 340/316 |
| 5,246,573 A | 9/1993 | Lodholz et al. | |
| 6,019,892 A | 2/2000 | Wilcher | |
| 6,086,757 A | 7/2000 | Wilcher | |
| 2007/0102334 A1 * | 5/2007 | Wilcher et al. | 210/159 |

* cited by examiner

*Primary Examiner* — Robert James Popovics
(74) *Attorney, Agent, or Firm* — Michael Best & Friedrich LLP

(57) ABSTRACT

A support plate is used in a cog rake bar screen of a wastewater treatment facility and the cog rake bar screen includes an adjustable pin rack system coupled to a frame. The support plate includes a plate having a centerline extending between opposite side walls of the plate. The plate includes a fastener hole for receiving a fastener to couple the plate to the pin rack system and the frame. A set screw is connected to the plate for adjusting position of the plate relative to the frame and thereby adjusting position of the pin rack system.

19 Claims, 5 Drawing Sheets

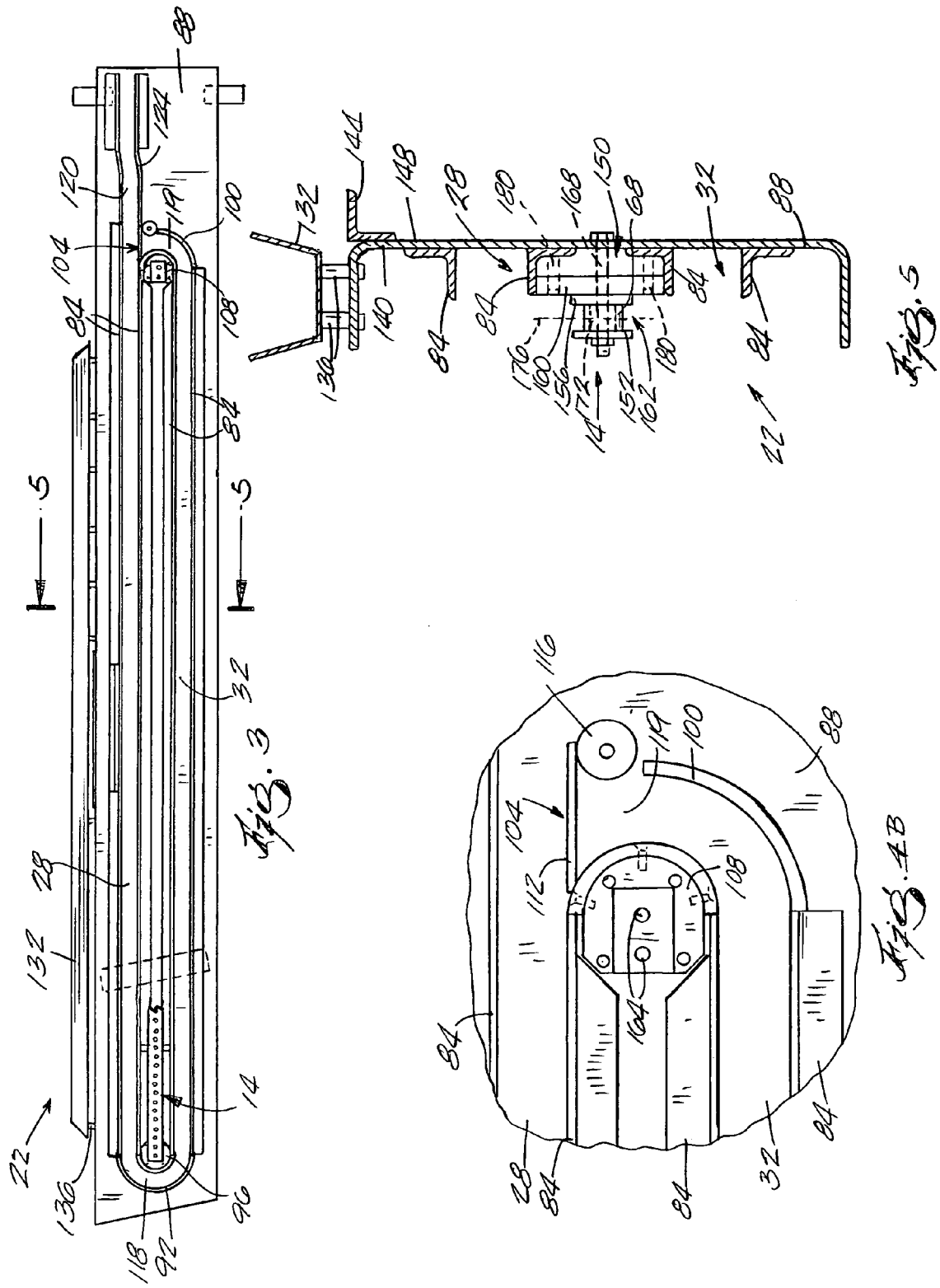

ADJUSTABLE PIN RACK SYSTEMS FOR COG RAKE BAR SCREENS

BACKGROUND

The present invention relates to a cog rake bar screen used in a wastewater treatment facility, and more particularly to an adjustable pin rack system for use with the cog rake bar screen.

Cog rake bar screens are normally used in municipal and industrial coarse screening applications. The primary purpose of the screens is to retain and remove debris from channeled water flowing into water treatment plants, industrial sites, drainage facilities or overflow control facilities. Usually operated on float controls or timers, the rakers periodically remove debris that has accumulated on the upstream side of a bar screen mounted in the waste stream.

Cog rake bar screens are a front cleaning type of screen mechanism, and typical designs have no moving parts permanently located below the channel water surface. The mechanical cog rakes are guided by a guide track and may, for example, move in a continuous path. Specifically, the cog rake may be lowered along the path and then move upward to remove the debris which has accumulated on the bar screen. After being raised, the cog rake may dump the debris into a trough.

Cog rake bar screens utilize involute gearing and a pin rack system consisting of a series of flat bars, rollers, bushings, pins (bolts), supports, and guides. Driven cog wheels on the motorized drive carriages engage the rollers and bushings of the pin rack system to cause a rake attached to the drive carriage to move along a path defined by the guide track.

Cog rake bar screens are elongated large metal assemblies and require relatively tight design and manufacturing tolerances. During manufacture, all guide tracking is generally shop fit and welded into place inside main side frames. The pin rack system may be shop fit or field installed. The inability of fabrication shops to hold the required tolerances and misalignment resulting from shipping and installation phases of a project cause significant issues. Misalignment and loose tolerances lead to the moving drive carriage and attached rake arm having a tendency to vibrate or pulsate while in operation. If the cog rake bar screens do not run smoothly, then excess vibration causes high stress loading on the sub-assemblies of the main drive carriage which operates within the guide tracks, but can also lead to problems with the engagement of the drive carriage mounted cog wheels as they engage the pin rack system. Excess vibration may also cause the rake arm to lose debris it is attempting to remove.

When components supporting the pin rack system or side frames of the cog rake bar screen are not fabricated to the exact specification, the field personnel and installation contractors are required to shim or grind the screen frames where they meet the pin rack system in order to provide proper cog wheel centerline to centerline spacing and alignment. The practices of shimming and grinding are expensive and time consuming and the overall process involved makes it difficult to provide the required end result. Further, machined blocks currently utilized to support the pin rack system are large, heavy and expensive to fabricate. Attempts to substitute spacers for the blocks do not work, as spacers do not provide proper support of the pin rack system, and allow the pin rack to flex and induce additional vibration of the main drive carriage and rake arm.

SUMMARY

In one embodiment, the invention provides a support plate for use in a cog rake bar screen of a wastewater treatment facility, the cog rake bar screen including an adjustable pin rack system coupled to a frame. The support plate includes a plate having a centerline extending between opposite side walls of the plate, the plate including a fastener hole for receiving a fastener to couple the plate to the pin rack system and the frame. A set screw is connected to the plate for adjusting position of the plate relative to the frame and thereby adjusting position of the pin rack system.

In another embodiment, the invention provides an adjustable pin rack system for use in a cog rake bar screen of a wastewater treatment facility, the cog rake bar screen including a frame. The pin rack system includes first and second elongate bars spaced apart from and generally parallel to one another, wherein the first and second elongate bars are spaced apart from the frame and configured for coupling to the frame. A plurality of rollers are positioned between the first and second bars, each roller including a center hole that defines an axis of the roller and each roller defining a pin rack centerline generally perpendicular to the axis of the center hole. The pin rack system includes a plurality of fasteners wherein each fastener couples one of the plurality of rollers at the center hole to the first and second bars. An adjustable support plate is positioned between one of the first and second bars and the frame, and the support plate is coupled to the frame and one of the plurality of rollers by the respective fastener. The support plate includes an adjustment mechanism for adjusting the position of the support plate with respect to the frame.

In yet another embodiment, the invention provides a side frame assembly for use in a cog rake bar screen of a wastewater treatment facility. The side frame assembly includes a frame having a flat planar surface and at least two spaced apart ribs extending from the flat planar surface of the frame. The spaced apart ribs define an elongate channel for housing a roller and the channel extends along a length of the frame. A pin rack system is coupled to the frame and positioned adjacent the channel such that the pin rack system extends along a portion of the channel. The pin rack system includes a plurality of cog rollers wherein each cog roller defines a pin rack centerline generally perpendicular to a length of the channel. An adjustable support plate is coupled to the frame and one of the plurality of rollers. The support plate is positioned between the pin rack system and the frame. The support plate includes an adjustment mechanism for adjusting position of the support plate with respect to the frame and for aligning the respective pin rack centerline generally parallel to at least one of the plurality of pin rack centerlines.

In still another embodiment, the invention provides a cog rake bar screen for use in a wastewater treatment facility. The cog rake bar screen includes a frame having an elongate channel extending along a length of the frame and a drive carriage including a guide roller assembly for guiding the drive carriage during movement. The guide roller assembly travels in the channel and the drive carriage includes a cog wheel for facilitating movement of the drive carriage along the frame. A pin rack system is coupled to the frame and positioned adjacent the channel such that the pin rack system extends along a portion of the channel. The pin rack system includes a plurality of cog rollers wherein each cog roller defines a pin rack centerline generally perpendicular to a length of the channel. An adjustable support plate is coupled to the frame and one of the plurality of rollers, and the support plate is positioned between the pin rack system and the frame. The support plate includes an adjustment mechanism for adjusting the position of the support plate with respect to the frame and for aligning the respective pin rack centerline generally parallel to at least one of the plurality of pin rack centerlines.

Other aspects of the invention will become apparent by consideration of the detailed description and accompanying drawings.

BRIEF DESCRIPTION OF THE DRAWINGS

FIG. 3 is a side view of a side frame assembly for a cog rake bar screen, including an adjustable pin rack system according to one embodiment of the invention.

FIGS. 4A and 4B are enlarged views of first and second ends of the side frame assembly shown in FIG. 3, and illustrate connections between two guide tracks.

FIG. 5 is an enlarged sectional view taken along line 5-5 of FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
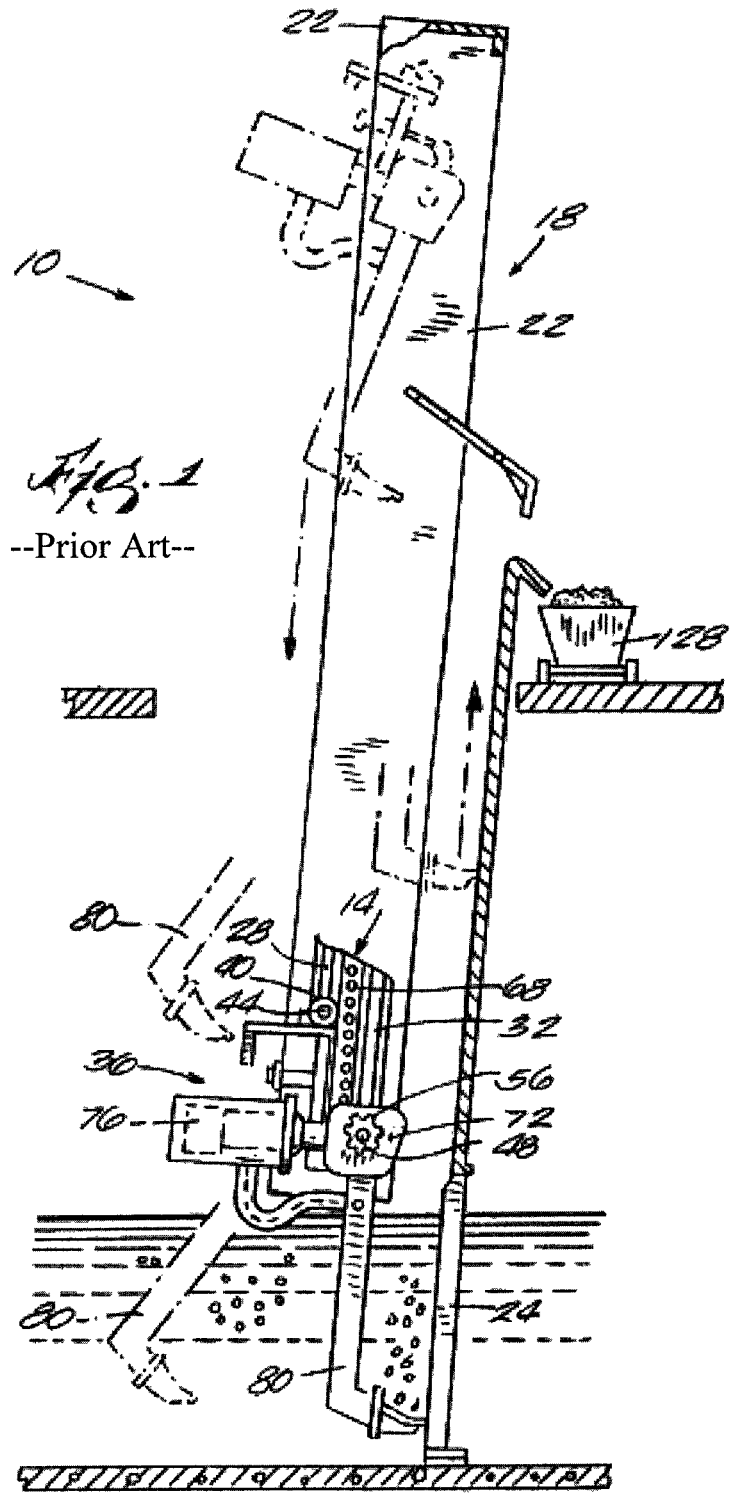
FIG. 1 is a side elevational view, with portions broken away, of a cog rake bar screen wherein an adjustable pin rack system of the present invention may be utilized.
Figure 2:
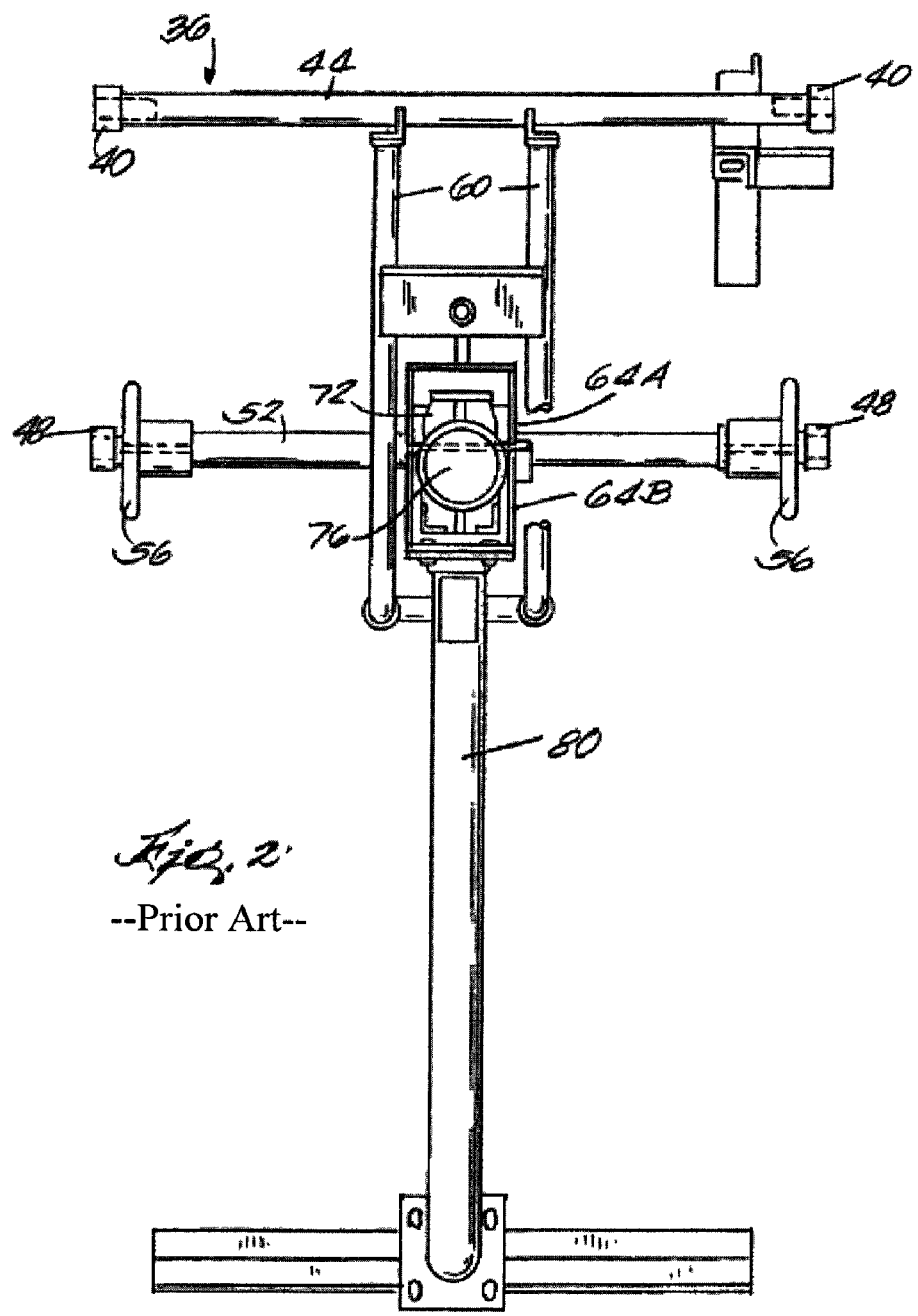
FIG. 2 is a plan view, with portions taken away, of a rake and drive assembly for use with the cog rake bar screen shown in FIG. 1.

FIG. 1 illustrates a cog rake bar screen, indicated generally at 10, for use in a wastewater treatment facility in which an adjustable pin rack system 14 (FIGS. 3 and 5) according to the present invention may be used. The cog rake bar screen 10 includes an inverted U-shaped frame 18, including side frame members 22 mounted over a water-carrying channel and adjacent to an upstream side of a bar rack 24. A first guide track 28 or channel, and a second guide track 32 or channel, which are further discussed below with respect to FIG. 3, are secured to each side frame 22. FIG. 2 illustrates a rake and drive assembly of the cog rake bar screen 10. The rake and drive assembly, indicated generally at 36, is more fully described, for example, in U.S. Pat. No. 5,246,573, which is incorporated by reference.

The rake and drive assembly includes guide rollers 40, or follower rollers, rotatably mounted to an upper guide shaft 44, which spans a distance between the two side frame members 22. The guide rollers 40 are engaged and constrained to ride in the guide tracks 28, 32. Similar guide rollers 48 are rotatably mounted to a lower drive shaft 52, which also spans the distance between the side frame members 22 and permits the guide rollers 48 to engage and ride in the guide tracks 28, 32. Cog wheels 56 are secured to each end of the drive shaft 52 inward from the guide rollers 48. A pair of frame members 60 are secured to and extend downwardly from the guide shaft 44. A pair of mounting brackets 64A, 64B are secured to the drive shaft 52 and a rod (not shown) is pinned to the upper mounting bracket 64A and is coupled to the frame members 60.

Referring to FIGS. 1 and 5, an aligned row of evenly spaced cog roller and bushing assemblies 68, which are part of the pin rack system 14, are secured on the inner side of each side frame member 22. The bushing portion of the cog roller and bushing assembly is shown as element 72 in FIG. 5. The cog roller and bushing assemblies 68 are positioned between the guide tracks 28, 32. As the rake and drive assembly 36 ascends and descends the guide tracks 28, 32, the driven cog wheels 56 engage the cog roller and bushing assemblies 68 to drive the rake and drive assembly 36. The drive shaft 52 has a conventional keyseat and key that is engaged by a worm reducer 72 driven by a shaft of an electric motor 76. The reducer 72 and the motor 76 drive the drive shaft 52 to cause the rake and drive assembly 36 to ascend and descend the guide tracks 28, 32.

The rake and drive assembly 36 includes a rake arm 80, which is rigidly attached to and extends generally downward from the frame members 60. Further, the rake arm 80 is coupled to the lower mounting bracket 64B. Rotation of the drive shaft 52 and in turn the cog wheels 56 will cause the entire rake and drive assembly 36 to ascend or descend via the cog wheels 56 and the guide rollers 40, 48 following in the guide tracks 28, 32 of the cog rake bar screen 10. As the rake and drive assembly 36 moves along the guide tracks 28, 32 via the guide rollers 40, 48, the rake arm 80 clears debris from the bar rack 24, as further described in U.S. Pat. No. 5,246,573, in a manner generally known to those skilled in the art. In a further embodiment, the rake arm 80 is pivotally attached to and extends generally downward from the frame members.

Figure 4A:
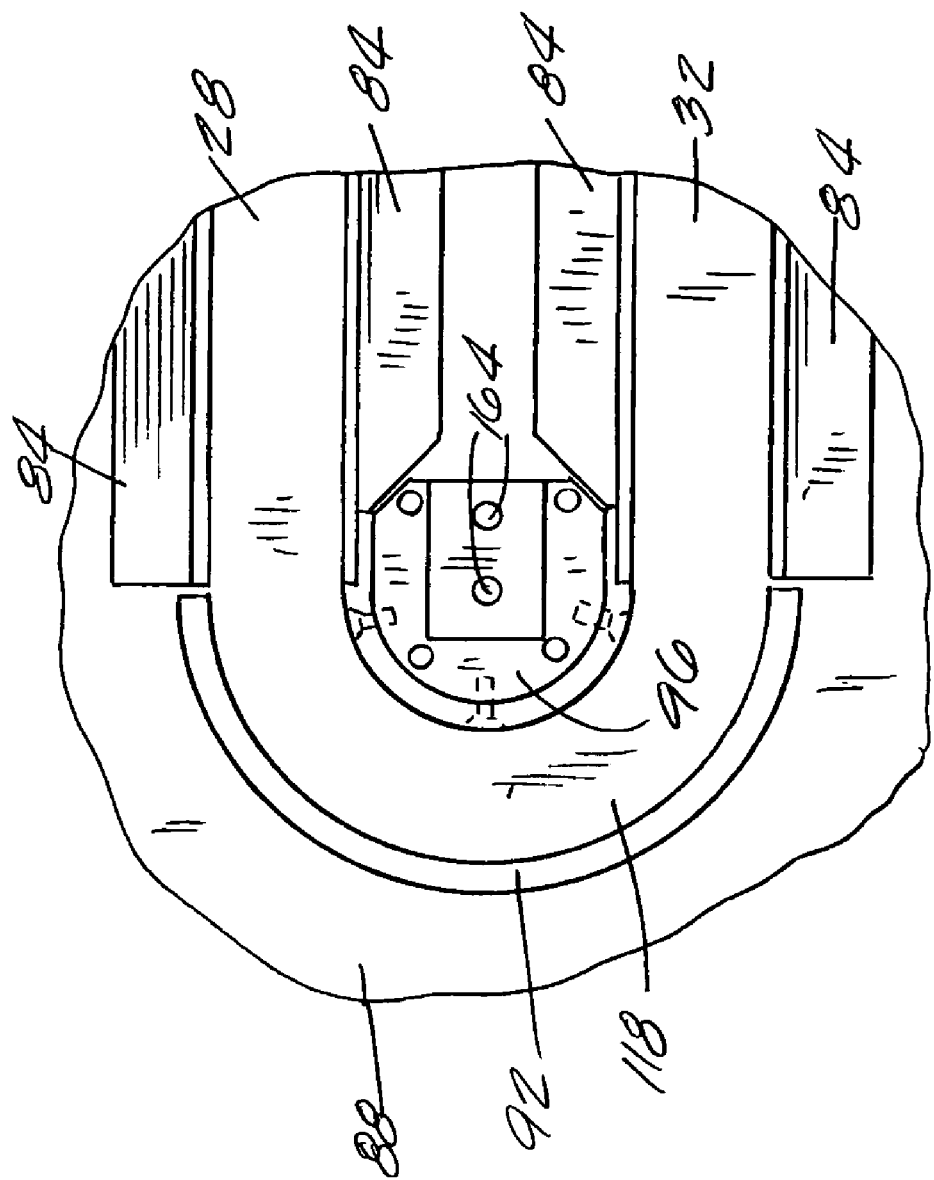

FIGS. 3 and 5 illustrate one of the side frame members 22 of the cog rake bar screen 10. The side frame member 22 includes ribs 84, or guide angles, secured to a U-shaped frame 88 to define the first guide track 28 and the second guide track 32. Referring to FIGS. 3 and 4A, first ends of the guide tracks 28, 32 are connected by a semi-circular tracking ring 92 and a first track round 96. Referring to FIGS. 3 and 4B, second ends of the guide tracks 28, 32 are connected by a tracking ring 100, a flap plate 104, and a second track round 108. The flap plate 104 includes an arm 112 and a roller 116. Thus, the first and second guide tracks 28, 32 form a closed path for the guide rollers 40, 48 to follow. In the illustrated embodiment, widths of the guide tracks 28, 32, a track section 118 between the first tracking ring 92 and the first track round 96, and a track section 119 between the second tracking ring 100 and the second track round 108 are substantially the same. The flap plate 104 should be positioned to allow the driveshaft guide rollers 48 to complete the desired path around the guide tracks 28, 32 and to prevent the follower guide rollers 40 mounted to the guide shaft 44 from following the closed path of the guide roller 48, as generally understood by those skilled in the art.

The first guide track 28 also includes an upper track section 120 that extends past the second tracking ring 100 and is separated from the second guide track 32 by the flap plate 104. The upper track section 120 includes a track offset 124 to allow the rake arm 80 to dump waste discharge in a trough 128 (FIG. 1), as is known in the art. In the illustrated embodiment, the side frame member 22 includes a power track trough 132, as is used in the industry. The power track trough 132 is secured to the frame 88 by fasteners 136. Further embodiments of the side frame member 22 may not include the power track trough 132.

It should be readily apparent to those of skill in the art that in further embodiments the first and second guide tracks may be formed of multiple sections or modules secured to the frame 88, or the side frame members 22 may be formed by multiple sections or modules.

FIG. 5 illustrates a section view of the side frame member 22 shown in FIG. 3. The guide tracks 28, 32 are formed by four elongate L-shaped ribs 84, or guide angles, coupled to a first surface 140 of the U-shaped frame 88. In the illustrated embodiment the guide angles 84 are welded to the frame 88. A guide angle 144 is coupled to a second surface 148 of the frame to facilitate mounting of the side frame member 22 to a support surface (not shown).

Referring to FIGS. 3 and 5, the pin rack system 14, which is partially shown in FIG. 3, is spaced from the frame 88 such that a cavity 150 is formed between the pin rack system 14 and two of the ribs 84 of the guide tracks 28, 32. The pin rack system 14 includes first and second elongate bars 152 and 156, cog roller and bushing assemblies 68, adjustable support plates 160, and fasteners 168. Only one cog roller and bushing assembly 68, support plate and fastener is shown in FIG. 5, although it should be readily apparent to those of skill in the art, the pin rack system 14 includes a plurality of each spaced along a substantial portion of the length of the frame 88.

The first and second bars 152, 156 extend between the first track round 96 and the second track round 108. The first and second bars 152, 156 are spaced apart to form a gap 162 therebetween and are generally parallel to each other. In the illustrated embodiment, the first and second bars 152, 156 are attached to the first and second track rounds 96, 108. As shown in FIGS. 4A and 4B, each track round 96, 108 includes holes 164 for coupling the bars 152, 156 to the track round 96, 108 with a fastener 168 (FIGS. 3, 4A and 4B).

The cog roller and bushing assemblies 68 (also shown in FIG. 1) are positioned between the first and second bars 152, 156 within the gap 162 and are coupled to the bars 152, 156. In preferred embodiment, the cog roller and bushing assemblies 68 are spaced approximately every 2 inches along a length of the pin rack system 14. However, it should be readily apparent to those of skill in the art that each cog roller and bushing assembly 68 may be spaced closer to or further from the adjacent cog roller and bushing assemblies based upon the width of the application. Further, each cog roller and bushing assembly 68 defines a pin rack centerline 176 substantially perpendicular to the elongate bars 152, 156 and guide tracks 28, 32. As shown in FIG. 3, multiple fasteners 168 are used in the pin rack system 14. In the illustrated embodiment, the fastener 168 includes a bolt and lock nut, however, in further embodiments other known fastening means may be used.

The adjustable support plate 160 is positioned within the cavity 150 between the first and second guide tracks 28, 32. The support plate 160 is coupled to the first and second bars 152, 156 of the pin rack system 14, one of the cog roller and bushing assemblies 68, and the frame 88 by the fastener 168 of the respective cog roller and bushing assembly 68. The support plate 160 is positioned adjacent the second bar 156 of the pin rack system 14. The support plate 160 supports and holds the pin rack system 14. The support plate 160 includes two set screws 180 that are threaded through the plate 160 and include ends that abut the guide angles 84, or the frame 88 in another embodiment. The set screws 180 are used to adjust the position of the support plate 160, and thereby the associated cog roller and bushing assembly 68, relative to the frame 88. In the illustrated embodiment, the support plate 160 is about 1 inch thick, which is about half the thickness, and thereby about half the weight, of the currently used support plates that must be fabricated to fit within the cavity 150. Further, the support plate 160 is fabricated from stainless steel plate flats cut to size, which eliminates the expensive and time consuming machining used to fabricate current support blocks to fit within the cavity 150. It should be readily apparent to those of skill in the art that the support plate may be fabricated from other materials, such as steel, polymer material (e.g., moly-filled nylon), or the like.

In a preferred embodiment, support plates 160 are spaced approximately every 2 feet along the length of the pin rack system 14, therefore, not all cog roller and bushing assemblies 68 are coupled to a support plate. Cog roller and bushing assemblies 68 that are not positioned adjacent a support plate 160 are coupled to the first and second bars 152, 156, although in a further embodiment the cog roller and bushing assemblies 68 may be coupled to the frame 88 as well. It should be readily apparent to those of skill in the art that the support plates 160 may be spaced closer to or further from the adjacent support plates.

In operation, the rake and drive assembly 36 ascends and descends the first and second guide tracks 28, 32 such that the rake arm 80 can remove debris from the water and deposit the debris in the trough 128 positioned above the water. To begin the removal process, the drive shaft guide rollers 48 are positioned in the first guide track 128 and the follower guide rollers 40 are positioned in the upper track section 120 of the first guide track 128. The rake and drive assembly 36 is positioned at or near a top of the side frame members 22, such that the rake arm 80 is not submerged in the water. The draft shaft 52, and thereby the cog wheels 56, are rotated in a first direction such that the entire assembly will descend down the first track 28. During rotation the cog wheels 56 engage the cog roller and bushing assemblies 68 of the pin rack system 14 to facilitate travel of the rake and drive assembly 36. When the cog wheels 56 reach the lowermost cog roller and bushing assemblies 68, the cog wheels 56 will then rotate about the lowermost cog roller and bushing assemblies 68, which are coupled to the first track round 96, to cause the drive shaft guide rollers 48 to move from the first guide track 28 to the second guide track 32. Continued rotation of the cog wheels 56 will then cause the entire assembly 36 to ascend until the cog wheels 56 reach the uppermost cog roller and bushing assemblies 68, which are coupled to the second track round 108. The flap plate 104 and the second track round 108 permit the guide rollers 48 to make a smooth transition from the second guide track 32 to the first guide track 28 as the cog wheels 56 rotate around the uppermost cog roller and bushing assemblies 68. During operation, the follower guide rollers 40 remain positioned within the first guide track 28, while the drive shaft guide rollers 48 are guided by the first guide track 28 during descent and the second guide track 32 during ascent.

During fabrication and installation of the side frame member 22 and the pin rack system 14, misalignment often occurs between the cog roller and bushing assemblies 68 along the length of the pin rack system 14 and the frame 88. Misalignment occurs when the side frame members 22 or associated components are not fabricated or assembled precisely, and by distortion to the frame 88 from coupling the guide angles 84 and other components to the frame 88. Such misalignment leads to the rake and drive assembly 36 and attached rake arm 80 vibrating or pulsating during operation. The adjustable support plate 160 provides an improved mechanism for aligning the cog roller and bushing assemblies 68 of the pin rack system 14 to be plumb and aligned. The set screws 180 are manipulated to adjust the position of the support plate 160 relative to the frame 88. Thereby, the cog roller and bushing assemblies 68 associated with each support plate 160 are repositioned as well. In use, the support plate 160 is adjusted until the pin rack centerlines 176 are plumb and the cog roller and bushing assemblies 68, and in particular the cog roller and bushing assemblies 68 coupled to the support plates 160, are aligned to the opposite side assembly by the allowable tolerance.

The adjustable support plates 160 facilitate fine tune adjustments of the pin rack system 14 to align the pin rack centerlines 176 of the cog roller and bushing assemblies 68. By manipulating the set screws 180, the support plates 160 move either toward or away from the frame 88. Further, when the frame 88 or the pin rack system 14 is bowed, one side of the support plate 160 may be moved further than the other side. The support plates 160 and the pin rack system 14 are adjustable about 0.25 inches towards the frame 88 and away from the frame 88, which could eliminate the need for shimming or grinding to align the pin rack system 14.

It should be readily apparent to those of skill in the art that the adjustable support plates may be used in further embodiments of the cog rake bar screen 10. For example, the adjustable support plates may be used with cog rake bar screens including three guide tracks, wherein two of the guide tracks define a path for the drive shaft guide rollers and the third guide track defines a path for the follower rollers.

Figure 6A:
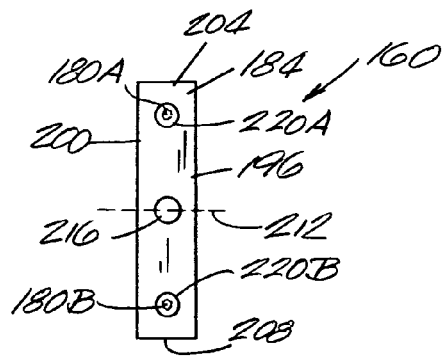
FIGS. 6A and 6B illustrate a support plate according to one embodiment of the pin rack system shown in FIG. 3.
Figure 6B:
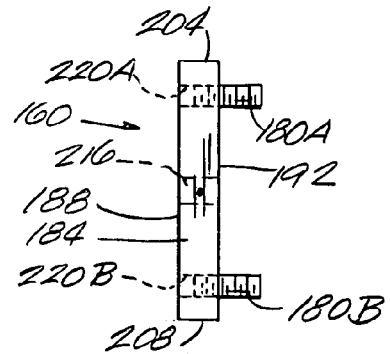

FIGS. 6A and 6B illustrate the adjustable support plate 160 shown in FIG. 5. The support plate 160 includes a rectangular plate 184 having a top surface 188, a bottom surface 192, first and second opposite side walls 196 and 200, and third and fourth opposite side walls 204 and 208. A centerline 212 extends between the first and second side walls 196, 200 of the plate 184. A fastener hole 216 is positioned generally along the centerline 212 of the plate 184 and receives the fastener 168 (FIG. 5) for coupling the support plate 160 to the frame 88. Referring to FIG. 5, one of the cog roller and bushing assemblies 68 of the pin rack system 14 is coupled to the support plate 160 by the fastener 168 and is aligned with the fastener hole 216 of the plate 184.

Two screw holes 220A, 220B are formed in the support plate 160 for receiving first and second set screws 180A, 180B. The first screw hole 220A and set screw 180A are positioned adjacent the third side wall 204 of the plate 184, and the second screw hole 220B and set screw 180B are positioned opposite the first set screw 180A and adjacent the fourth side wall 208. The set screws 180 extend from the bottom surface 192 of the plate 184 and abut the guide angles 84 of the frame 88 when coupled to the pin rack system 14 (FIG. 5). In the illustrated embodiment, the support plate 160 is about 1 inch thick, about 1.5 inches wide, and about 6.593 inches long.

Figure 7A:
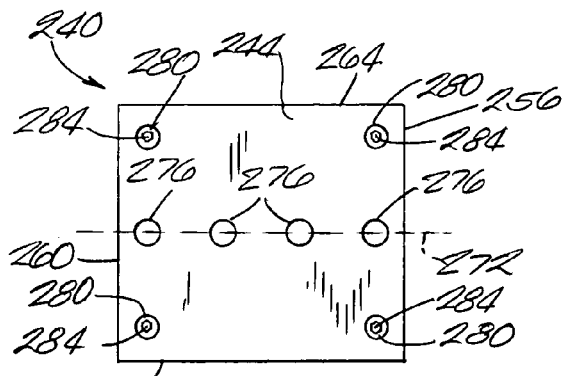
FIGS. 7A and 7B illustrate a splice plate according to one embodiment for use with the pin rack system.
Figure 7B:
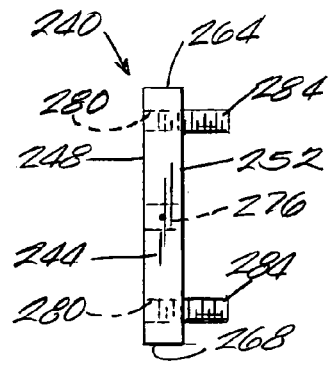

FIGS. 7A and 7B illustrate one embodiment of an adjustable support plate for use in a cog rake bar screen 10. A splice plate 240 is used in embodiments of the cog rake bar screen where the side frame member 22 is formed from multiple frame sections or modules, or when the pin rack system 14, and in particular the first and second bars 152, 156, is formed from multiple sections or modules. The splice plate 240 is used as a support plate, as described above, between two frame sections or two pin rack sections.

The splice plate 240 includes a rectangular plate 244 having a top surface 248, a bottom surface 252, first and second opposite side walls 256 and 260, and third and fourth opposite side walls 264 and 268. A centerline 272 extends between the first and second side walls 256, 260 of the plate 244. Four fastener holes 276 are positioned generally along the centerline 272 of the plate 244 to receive fasteners for coupling the splice plate 240 to the frame 88. One of the cog roller and bushing assemblies 68 of the pin rack system 14 is coupled to the splice plate 240 by each fastener such that a cog roller and bushing assembly 68 is aligned with each fastener hole 276 of the plate 244. In a preferred embodiment, at least fastener hole 276 of the plate 244 is used to couple the slice plate 240 to each frame section or pin rack section.

Four screw holes 280 are formed in the splice plate 240 for receiving four set screws 284. One of the screw holes 280 and the associated set screw 284 is positioned adjacent each corner of the plate 244. The set screws 284 extend from the bottom surface 252 of the plate 244 and abut the guide angles 84 of the frame 88 when coupled to the pin rack system 14 (FIG. 5). In the illustrated embodiment, the splice plate is about 1 inch thick, about 7.5 inches wide, and about 6.593 inches long.

Figure 8A:
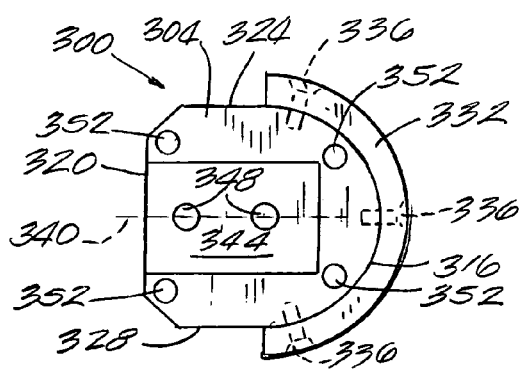
FIGS. 8A and 8B illustrate another embodiment of a support plate of the pin rack system used as track rounds for the side frame assembly.
Figure 8B:
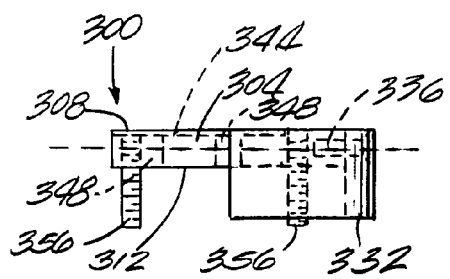

FIGS. 8A and 8B illustrate an embodiment of an adjustable support plate used as the first and second track rounds 96, 108 shown in FIGS. 4A and 4B, which are identical. A track round 300 includes a plate 304 having a top surface 308, a bottom surface 312, a first side wall 316 that curves outwardly and is semi-circular, a second side wall 320 opposite the first side wall 316, and third and fourth side walls 324 and 328 that extend from opposite ends of the first side wall 316 and the second side wall 320. The third and fourth sidewalls 324, 328 are shaped to complement the shape of the adjacent guide angles 84. A curved plate 332 is attached to the first side wall 316 of the plate 304 to help define the track sections 118, 119 connecting the first and second guide tracks 28, 32 (FIGS. 4A and 4B). The curved plate 332 is shaped to complement the first side wall 316 and is attached to the plate 304 by screws 336, or other known fasteners.

A centerline 340 extends between the first and second side walls 316, 320 of the plate 304. An attachment portion 344 is defined in the top surface 308 of the plate 304. The attachment portion 344 is an area recessed from the top surface 308 of the plate 304 and positioned generally along the centerline 340. In the illustrated embodiment, the attachment portion 344 abuts the second side wall 320, but none of the other areas. Two fastener holes 348 are positioned generally along the centerline 340 of the plate 304, and in the attachment portion 344 to receive fasteners for coupling the track round 300 to the frame 88. In use, the fastener holes 348, and corresponding fasteners are used to couple one end of the pin rack system 14 to the frame 88 (FIG. 3). One end of the second bar 156 of the pin rack system 140 is received in the attachment portion 344 of the plate 304. Two cog roller and bushing assemblies 68 of the pin rack system 14 (including a lowermost or an uppermost cog roller and bushing assembly) are coupled to the track round 300 by each fastener such that a cog roller and bushing assembly is aligned with each fastener hole 348 of the plate 304.

Four screw holes 352A-352D are formed in the track round 300, each for receiving one of four set screws 356A-356D. Two screw holes 352A, 352B and the associated set screws 356A, 356B are positioned adjacent the first side wall 316, on opposite sides of the centerline 340, and aligned with one another. Two more screw holes 352C, 352D and the associated set screws 356C, 356D are positioned adjacent the second side wall 320, on opposite sides of the centerline 340, and aligned with one another. The set screws 356 extend from the bottom surface 312 of the plate 304 and abut the guide angles 84 of the frame 88 when coupled to the pin rack system 14 (FIG. 5). In the illustrated embodiment, the track round 300 is about 1 inch thick.

The adjustable support plates described above are used at different portions of the pin rack system 14 to facilitate fine tune adjustments of the pin rack system 14 and align the pin rack centerlines 176 of the cog roller and bushing assemblies 68. By manipulating the set screws, the support plates move either toward or away from the frame 88 to align the pin rack centerlines 176. Therefore, the entire pin rack system is adjustable along its length, towards and away from the frame 88. It should be readily apparent to those of skill in the art that the support plates may have other shapes that include more than one fastener hole, and thereby support more than one cog roller and bushing assembly 68, and may include any number of set screws to provide adjustment of the support plate. In further embodiments, other known adjustment mechanisms may be used rather than set screws. The adjustable support plates fit within the cavity 150 defined by the side frame member 22 and fully support and stabilize the pin rack system 14. The support plates may be incorporated into existing cog rake bar screens, if necessary.

Various features and advantages of the invention are set forth in the following claims.

What is claimed is:

1. An adjustable pin rack system for use in a cog rake bar screen of a wastewater treatment facility, the cog rake bar screen including a frame, the pin rack system comprising:
    first and second elongate bars spaced apart from and generally parallel to one another, wherein the first and second elongate bars are spaced apart from the frame and configured for coupling to the frame;
    a plurality of rollers positioned between the first and second bars, each roller including a center hole that defines an axis of the roller and each roller defining a pin rack centerline generally perpendicular to the axis of the center hole;
    a plurality of fasteners wherein each fastener couples one of the plurality of rollers at the center hole to the first and second bars;
    a support plate positioned between one of the first and second bars and the frame, the support plate coupled to the frame and one of the plurality of rollers by one of the plurality of fasteners, the support plate including a set screw for adjusting the position of the support plate along the axis of the roller with respect to the frame.

2. The pin rack system of claim 1 wherein the position of the support plate is adjusted such that the pin rack centerline of the respective roller is generally aligned with at least one of the plurality of pin rack centerlines of another roller.

3. The pin rack system of claim 1, and further comprising more than one support plate, the support plates spaced apart along a length of the one of the first and second bars.

4. The pin rack system of claim 1 wherein the support plate includes a plate having a centerline extending between two opposite side walls of the plate and a fastener hole for receiving the respective fastener, and the support plate includes a plurality of set screws connected to the plate and positioned on opposite sides of the centerline.

5. The pin rack system of claim 1 wherein the support plate has an adjustment tolerance of about 0.25 inches towards the frame and away from the frame.

6. A side frame assembly for use in a cog rake bar screen of a wastewater treatment facility, the side frame assembly comprising:
    a frame including a flat planar surface;
    at least two spaced apart ribs extending from the flat planar surface of the frame, the spaced apart ribs defining an elongate channel for housing a roller, the channel extending along a length of the frame;
    a pin rack system coupled to the frame and positioned adjacent the channel such that the pin rack system extends along a portion of the channel, the pin rack system including a plurality of cog rollers wherein each cog roller defines a pin rack centerline generally perpendicular to a length of the channel; and
    a support plate coupled to the frame and one of the plurality of rollers, the support plate positioned between the pin rack system and the frame, the support plate including a set screw for adjusting the position of the support plate with respect to the frame and for aligning the respective pin rack centerline generally parallel to at least one of the plurality of pin rack centerlines of another cog roller.

7. The side frame assembly of claim 6 wherein the support plate comprises:
    a plate having a centerline extending between two opposite side walls of the plate and a fastener hole for receiving a fastener to couple the plate to the roller and the frame; and
    two set screws connected to the plate and positioned on opposite sides of the centerline.

8. The side frame assembly of claim 6 wherein more than one support plate are coupled to the frame, each support plate coupled to one of the plurality of rollers and the support plates positioned along a length of the pin rack system.

9. The side frame assembly of claim 6 wherein four spaced apart ribs extend from the flat planar surface of the frame to define first and second elongate channels extending along the length of the frame, first ends of the channels being connected by a first track portion and second ends of the channels being connected by a second track portion, and further wherein the pin rack system is positioned between the two channels and extends between the first and second track portions.

10. The side frame assembly of claim 9, and further comprising:
    a first support plate positioned between the pin rack system and the frame adjacent the first track portion, the first support plate coupled to the frame and one of the plurality of rollers, the first support plate including a set screw for adjusting the position of the first support plate with respect to the frame and for aligning the respective pin rack centerline generally parallel to at least one of the plurality of pin rack centerlines of another roller; and
    a second support plate positioned between the pin rack system and the frame adjacent the second track portion, the second support plate coupled to the frame and one of the plurality of rollers, the second support plate including a set screw for adjusting the position of the second support plate with respect to the frame and for aligning the respective pin rack centerline generally parallel to at least the pin rack centerlines associated with the first.

11. The side frame assembly of claim 6 wherein the frame comprises a plurality of frame sections connected together to form the frame, and wherein the support plate is a splice support plate positioned between the pin rack system and adjacent frame sections, the splice support plate coupled to one of the frame sections and one of the plurality of rollers and the splice support plate coupled to the other frame section and one of the plurality of rollers, the splice support plate including a set screw for adjusting the position of the splice support plate with respect to the frame sections and for aligning the respective pin rack centerlines generally parallel to at least one of the plurality of pin rack centerlines of another roller.

12. The side frame assembly of claim 6 wherein the pin rack system comprises a plurality of pin rack sections connected together to form the pin rack system, and wherein the support plate is a splice support plate positioned between the adjacent pin rack sections and the frame, the splice support plate coupled to the frame and a roller of one of the pin rack sections and the splice support plate coupled to the frame and a roller of the other pin rack section, the splice support plate including a set screw for adjusting the position of the splice support plate with respect to the frame and for aligning the respective pin rack centerlines generally parallel to at least one of the plurality of pin rack centerlines of another roller.

13. A cog rake bar screen for use in a wastewater treatment facility, the cog rake bar screen comprising:
- a frame including an elongate channel extending along a length of the frame;
- a drive carriage including a guide roller assembly for guiding the drive carriage during movement, wherein the guide roller assembly travels in the channel, and the drive carriage includes a cog wheel for facilitating movement of the drive carriage along the frame;
- a pin rack system coupled to the frame and positioned adjacent the channel such that the pin rack system extends along a portion of the channel, the pin rack system including a plurality of cog rollers wherein each cog roller defines a pin rack centerline generally perpendicular to a length of the channel; and
- a support plate coupled to the frame and one of the plurality of rollers, the support plate positioned between the pin rack system and the frame, the support plate including a set screw for adjusting the position of the support plate with respect to the frame and for aligning the respective pin rack centerline generally parallel to at least one of the plurality of pin rack centerlines of another of the plurality of rollers.

14. The cog rake bar screen of claim 13 wherein the support plate comprises:
- a plate having a centerline extending between two opposite side walls of the plate and a fastener hole for receiving a fastener to couple the plate to the respective roller and the frame; and
- two set screws connected to the plate and positioned on opposite sides of the centerline.

15. The cog rake bar screen of claim 13 wherein more than one support plate are coupled to the frame, each support plate coupled to one of the plurality of rollers and the support plates positioned along a length of the pin rack system.

16. The cog rake bar screen of claim 13 wherein two elongate channels extend along the length of the frame, first ends of the channels being connected by a first track portion and second ends of the channels being connected by a second track portion, and further wherein the pin rack system is positioned between the two channels and extends between the first and second track portions.

17. The cog rake bar screen of claim 16, and further comprising:
- a first support plate positioned between the pin rack system and the frame adjacent the first track portion, the first support plate coupled to the frame and one of the plurality of rollers, the first support plate including a set screw for adjusting the position of the first support plate with respect to the frame and for aligning the respective pin rack centerline generally parallel to at least one of the plurality of pin rack centerlines of another of the plurality of rollers; and
- a second support plate positioned between the pin rack system and the frame adjacent the second track portion, the second support plate coupled to the frame and one of the plurality of rollers, the second support plate including a set screw for adjusting the position of the second support plate with respect to the frame and for aligning the respective pin rack centerline generally parallel to at least the pin rack centerlines associated with the first support plate and the support plate.

18. The cog rake bar screen of claim 13 wherein the frame comprises a plurality of frame sections connected together to form the frame, and wherein the support plate is a splice support plate positioned between the pin rack system and adjacent frame sections, the splice support plate coupled to one of the frame sections and one of the plurality of rollers and the splice support plate coupled to the other frame section and one of the plurality of rollers, the splice support plate including a set screw for adjusting the position of the splice support plate with respect to the frame sections and for aligning the respective pin rack centerlines generally parallel to at least one of the plurality of pin rack centerlines of another of the plurality of rollers.

19. The cog rake bar screen of claim 13 wherein the pin rack system comprises a plurality of pin rack sections connected together to form the pin rack system, and wherein the support plate is a splice support plate positioned between the adjacent pin rack sections and the frame, the splice support plate coupled to the frame and a roller of one of the pin rack sections and the splice support plate coupled to the frame and a roller of the other pin rack section, the splice support plate including a set screw for adjusting the position of the splice support plate with respect to the frame and for aligning the respective pin rack centerlines generally parallel to at least one of the plurality of pin rack centerlines of another of the plurality of rollers.

* * * * *